Patented July 4, 1950

2,513,948

UNITED STATES PATENT OFFICE 2,513,948

PROCESS FOR STABILIZING EDIBLE FATTY OIL

Frank A. Lindsey, Jr., and William T. Maxwell, Savannah, Ga., assignors to The Southern Cotton Oil Company, Savannah, Ga., a corporation of New Jersey No Drawing. Application August 26, 1949, Serial No. 112,656

2 Claims. (Cl. 99—163)

1

Our invention relates to a procedure for improving the keeping qualities of edible shortenings, salad and cooking oils.

It is generally known that many oxidation inhibitors are available for oils and fats. Some of these antioxidants occur normally in nature, while others are synthetically prepared. Their use in edible fats is limited in most cases by the undesirable characteristics they impart to the product. In practice from 0.0001% to 0.1% of the old type antioxidants are used in shortenings, salad and cooking oils, the actual percentage being largely governed by the chemical composition and physical properties of the inhibitor.

There are a number of disadvantages in the use of the old type oxidation inhibitors or stabilizers. Not all of the undesirable effects on edible fats and oils that are listed below are necessarily imparted by the addition of any one stabilizer, but most of the old inhibitors have one or more of the following detrimental characteristics that greatly limit their use by the art:

(1) The smoking points of the fats and oils are materially lowered.

(2) The colors of the fats and oils are darkened; their darkening becoming more pronounced when the fats and oils are heated to a frying temperature.

(3) A "bead" is formed when the shortenings are melted. This "bead" is a ring of froth which stubbornly persists adjacent the sides of the container.

(4) Excessive frothing occurs when the fats and oils are used for frying.

(5) Distinct haze is apparent in salad and cooking oils and in the melted shortenings.

Although some of the old type oxidation inhibitors are quite effective in retarding the development of rancidity in edible oils and fats, they do not prevent a color reversion or darking in the oil or fat; and, of still more importance, while they retard the development of a decided rancid flavor, the oils and fats so stabilized do become stale to the taste quite as rapidly as the untreated oils and fats. This fact is clearly indicated when the old type antioxidants are used with soybean cooking or salad oils, as with soybean oils the reversion in color and flavor is quite rapid. There is therefore an especial need for a satisfactory stabilizer for these soybean products.

One object of the invention is to provide edible fats or oils containing a stabilizer or oxidation inhibitor that is open to none of the objections above enumerated and which has the

2 especial advantage of improving the keeping qualities of the products to a degree surpassing that of any heretofore known stabilizing agent. Another object of the invention is to provide practical and economical procedures for effecting stabilization.

By edible shortening we refer to a vegetable and/or animal fat, plastic at normal atmospheric temperature. The product may be a "compound" or of "hydrogenated" type. We designate as "compound" that type of shortening employing liquid oils of animal and/or vegetable origin mixed to a plastic consistency by the addition of high melting point stearine. By hydrogenated shortening we refer to liquid oils of animal and/or vegetable origin hydrogenated to a plastic consistency, with, in many instances, the addition of small amounts of high melting point stearine to raise the melting point of the product above the temperatures encountered in bake shops and kitchens. Included in these types of edible shortenings are several modifications that are well known to the art. These are classed as emulsifying shortenings, and are generally made of the hydrogenated type, though the compound type is sometimes used. These emulsifying shortenings are usually made by the addition to, or formation in, the shortening of emulsifying agents such as mono- and/or di-glycerides or free fatty acids, and so forth.

By salad and cooking oils we refer almost exclusively to the vegetable oils, though some animal fat may be used, and include summer and winter oils. The winter salad oils may be of the winterized type, or they may be natural winter oils, such as corn oils and soybean oil.

Where in the claims we specify edible oils, we mean to thereby include the above described types of shortenings, salad and cooking oils.

The preferred means of stabilizing these products is to introduce the stabilizer to the oil or fat during the finishing or deodorizing process. Thus, the fatty products are provided with an oxidation inhibitor before exposure to the atmosphere. As the process of deodorization of fats and oils is well known to the art, it need not be described. In the practice of our process a very small proportion of citric acid is introduced into the deodorizer while the oil and fat are at a suitable temperature for a suitable time under a very low pressure with steam agitation. Under these conditions citric acid decomposes and it is these decomposition products of citric acid that are effective as stabilizing agents. When citric acid is heated, it decomposes and breaks down as the following structural formulae indicate:

Citric acid 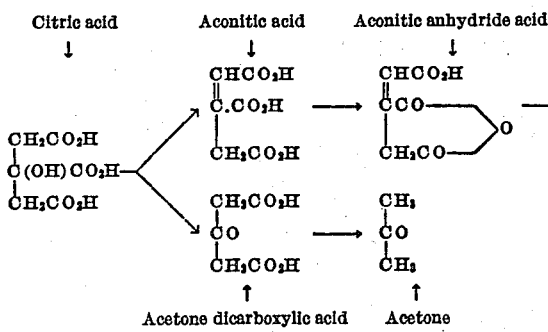 Aconitic acid   Aconitic anhydride acid   Itaconic anhydride   Citraconic anhydride 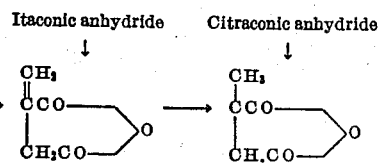

Acetone dicarboxylic acid   Acetone

By varying the treatment of the oil or fat after the addition of the citric acid, any of the decomposition products may be made to predominate with the exception of acetone dicarboxylic acid, which breaks down into carbon dioxide and acetone and passes off upon the reaction. In stating that any one of the remaining decomposition products predominate, we do not mean that it is the sole antioxidant present, as the reactions illustrated in the structural formulae do not go to completion and all remain to some extent after the decomposition of the citric acid.

While we have found that all these thermal decomposition products of citric acid are good oxidation inhibitors, we have found that the best oxidation inhibitor is produced if the factors of temperature, pressure and time are so regulated that the reaction is arrested after a substantial proportion of the citric acid is broken to aconitic acid and before the formation of more than a minor proportion of itaconic anhydride acid, with a still smaller proportion, if any, of citraconic anhydride. The process thus involves adding to the edible fatty oil a small percentage of isolated citric acid, heating the mixture to a suitable temperature at low pressure and continuing the heating for the time required, varying with the pressure and with the temperature, to break down a substantial proportion of the citric acid into aconitic acid and aconitic acid anhydride and arresting the process before the formation of any substantial amount of itaconic or citraconic anhydride. The composition produced by this process is a stabilized edible fatty oil containing citric acid and, as a decomposition product of citric acid, aconitic acid and aconitic anhydride acid either with no other decomposition product of citric acid or with such other decomposition product present in so minor a proportion relative to the aconitic acid and aconitic anhydride acid as not to constitute any significant proportion. It is preferred to arrest the process before any formation at all of such other decomposition products, but this involves an unnecessarily nice regulation of the time, temperature and pressure factors and we find that the improved composition gives a satisfactory stability test if the process is arrested when decomposition of citric acid has proceeded so far that the greatly predominant proportion of the decomposition products comprises only aconitic acid and aconitic anhydride acid. It should be understood that while the formation of these decomposition products is progressive, they occur to some extent simultaneously. For example, before the citric acid is completely broken down to aconitic acid anhydride, the latter is being broken down into itaconic anhydride, and so on. Therefore the process must be arrested before the citric acid is completely decomposed so as to insure that the edible oil will contain the highest possible proportion of aconitic acid and its anhydride. As above stated, this may be effected by stopping the reaction in the citric-aconitic stage and with little or no overlapping into the aconitic-itaconic stage.

The following is a specific description of one example of our improved process as practiced on a plant scale. Three pounds of anhydrous citric acid are added to a deodorizing kettle containing 30,000 pounds of vegetable oil. (The percentage of citric acid is thus about 0.01%.) The batch is agitated with steam under an absolute pressure of 12 mm. mercury at a temperature of 140° to 150° C. for ten minutes before cooling and subsequent filtering. The treated oil had an Active Oxygen stability test of 16 hours compared to 7 hours for a control batch to which no citric acid was added before treatment, and an Active Oxygen test of 12 hours on the citric acid-vegetable oil mixture before heat treatment. A permissible modification is to add the citric acid to the fat or oil in an atmosphere of inert gas.

The reaction may continue for as long as two hours if the temperature does not greatly exceed 140° C. With the addition of a smaller proportion of citric acid than that above specified and with the reaction continued for ten minutes at a temperature of 160° C., the hydrogenated vegetable oil shortening will give a stability by the Active Oxygen Method of as high as 90 hours.

As a useful added step to any edible fat or oil that has been subjected to our process, steam may be passed through the stabilized product, whereby the anhydride decomposition product may be changed to the acid form. The temperature of the fat or oil thus subjected to steam should be maintained below 100° C. This procedure does not affect the keeping qualities of the shortening and oil products and demonstrates that the aconitric acid is as good an antioxidant as its anhydride.

The limits of time and temperature under the lowest practicable pressure may be said to be, in time, from 5 minutes to 4 hours and, in temperature, from 120° C. to 190° C. Within these ranges the time factor should be nearer the higher range specified with the approximately minimum temperature specified, while the time factor should be nearer the lower range specified with the approximate maximum temperature specified. Another factor affecting time and temperature is the percentage of citric acid, which may vary from 0.0005 to 0.1%. The practice of the process requires no experimentation, since the examples given are operative. Obviously, however, with different edible fatty oils the operator will find it desirable to make tests within the time, temperature and pressure ranges above specified to determine what particular factors will give the most highly stabilized product and otherwise most satisfactory results.

It should be borne in mind that our process does not cover broadly the addition of citric acid and aconitic acid, including the anhydride, to edible fatty oils. Merely adding isolated citric acid, or isolated citric acid and aconitic acid, or isolated aconitic acid or anhydride (whether or not the aconitic acid is previously formed by decomposing citric acid), even when followed by heating under vacuum at high temperature, does not give the stability secured by adding the citric acid and heating as hereinbefore described. In other words, the nascent formation of thermal decomposition products of citric acid imparts to the edible fatty oil a degree of stability distinctly superior to that produced by the mere addition of citric acid per se or by the mere addition of any of its decomposition products added, as such, not in the nascent stage. This discovery is disclosed in a copending application filed by us September 17, 1943, Ser. No. 502,814 (now Patent No. 2,486,424, issued November 1, 1949). At the time this earlier application was filed it was believed that optimum stabilization would be effected if the decomposition process were carried well into the citraconic anhydride stage; and indeed good stabilization was thereby effected. However, it has since been discovered that the highest degree of stabilization can be effected by not carrying the reaction substantially beyond the citric-aconitic stage, or not so far into the aconitic-itaconic stage as to form more than a minor proportion of itaconic anhydride relative to the aconitic acid and anhydride. It is this specific discovery upon which the present application is based.

The qualities of edible shortenings, salad and cooking oil characterizing the product of our process may be listed as follows:

Stabilization against oxidation.

Stabilization against color reversion or darkening.

Maintenance of the odor or flavor.

No appreciable lowering of the smoking points of the products.

No darkening of color when heated to a frying temperature.

No substantial production of frothing when the products are used for frying.

No "beading."

Distinct improvement in keeping qualities.

What is claimed is:

1. The process of stabilizing an edible fatty oil which comprises adding thereto a small proportion of substantially isolated citric acid and heating the mixture to within a range of 120 to 190 degrees centigrade and continuing the heating for the time required, varying with the pressure and with the temperature within such range, to break down a substantial part of the citric acid into aconitic acid and aconitic anhydride acid and arresting the process before the formation of more than a minor proportion of itaconic anhydride relative to the proportion of the aconitic acid and aconitic anhydride.

2. The process of stabilizing an edible fatty oil which comprises adding thereto a small proportion of substantially isolated citric acid and heating the mixture to within a range of 120 to 190 degrees centigrade and continuing the heating for the time required, varying with the pressure and with the temperature within such range, to break down only such proportion of the citric acid as will effect the nascent formation of aconitic acid and aconitic anhydride acid without the production of substantial proportions of any of the other anhydrides that would be formed by a continuation of the process.

FRANK A. LINDSEY, Jr.
WILLIAM T. MAXWELL.

No references cited.